March 22, 1966 C. E. HARDIES 3,242,413

MAGNETIC CIRCUIT EMPLOYING A SATURABLE REACTOR AND SATURABLE TRANSFORMER FOR FIRING A SILICON CONTROLLED RECTIFIER

Filed May 1, 1961 2 Sheets-Sheet 1

*INVENTOR.*
CHARLES E. HARDIES
*BY* Shanley & O'Neil
*ATTORNEYS*

INVENTOR.
CHARLES E. HARDIES
BY Shanley & O'Neil
ATTORNEYS

United States Patent Office 3,242,413

Patented Mar. 22, 1966

3,242,413

MAGNETIC CIRCUIT EMPLOYING A SATURABLE REACTOR AND SATURABLE TRANSFORMER FOR FIRING A SILICON CONTROLLED RECTIFIER

Charles E. Hardies, Butler, Pa., assignor to Magnetics, Inc., a corporation of Pennsylvania Filed May 1, 1961, Ser. No. 106,796
5 Claims. (Cl. 321—18)

Magnetic amplifiers have found wide application in the automatic-control field because of their reliability, ruggedness, and other advantages well known in the art. In a typical control application, a saturable reactor is connected between an A.C. voltage source and a load to provide voltage regulated power supply. While this application of a saturable reactor provides many of the aforementioned advantages, one disadvantage is that the load or output windings of the saturable reactor must be able to handle load power. This places numerous design limitations on the physical structure of the saturable reactor, notably in size and weight, in order to provide large current capacity.

A general objective of the invention is to provide magnetic control appartus in which the magnetic control components may be isolated from the load circuit without sacrificing magnetic control but improving it. To carry out this objective the invention combines the best features of saturable reactors and controllable impedance devices such as the solid state thyratron device.

Solid state thyratron device as used herein refers to devices which present a high impedance to current in one direction, the reverse direction, and may be controlled to exhibit low impedance in the forward direction in response to a gating signal. In effect they are controllable rectifiers having main current carrying terminals, the anode and cathode, and a gating terminal which initiates flow or fires the device in the forward direction. After firing, for the remainder of the cycle, the controllable rectifier is under the control of the potential across the main current carrying terminals. In the latter respect, they are similar to the well known gaseous thyratrons, but they differ in important operational respects: their impedance after firing is much lower than the gaseous thyratron; the turn off and turn on time is measured in microseconds rather than milliseconds; and for control, require a low voltage power signal, with strict limitations on the power ranges which may be applied without damage to the device. Commercially such solid state devices are available under various names such as "Control Rectifiers" (General Electric Company); in the art they are generally referred to as silicon controlled rectifiers (SCR).

The teachings of the invention make magnetic controls ideally suited to the operational requirements of these solid state thyratron devices. In describing the invention reference will be had to the accompanying drawings in which.

Figure 1:
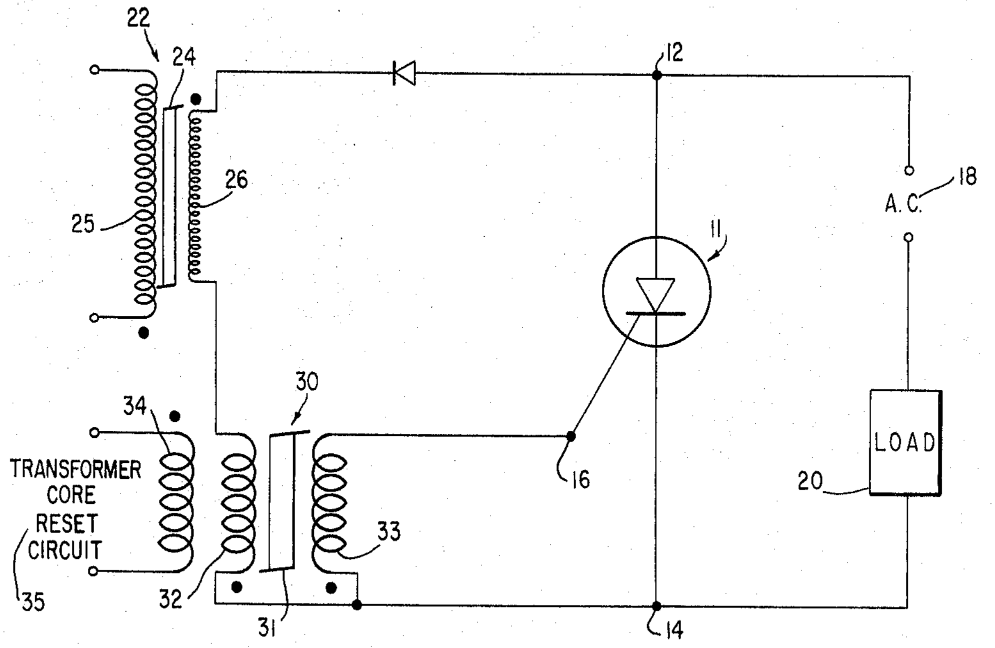
FIGURE 1 is an electrical schematic diagram of apparatus embodying the invention.

Referring to FIG. 1, solid state device 11 includes anode terminal 12, cathode terminal 14 and gating terminal 16. The main current carrying terminals 12 and 14 are connected in series to an A.C. voltage source 18 and load means 20.

Saturable reactor 22 includes saturable core 24, control input winding 25, and load or output winding 26. Load winding 26 is connected in a circuit arm providing another current path for A.C. source 18; this circuit arm includes rectifier 28 and reactance device 30.

Reactance device 30 takes the form of a transformer having a saturable core 31, primary winding 32, secondary winding 33, and core reset winding 34. Rectifier 28, load winding 26 and primary winding 32 are in series and connected to anode terminals 12 and cathode terminal 14—providing a current path shunting the main current path through the solid state thyratron device 11. The secondary winding 33 is connected to the control terminal 16. Reset winding 34 is magnetically coupled to core 31 and connected in a transfer core reset circuit 35.

Saturable cores 24 and 31 are formed of rectangular hysteresis loop core material. The hysteresis loop of core 24 is relatively narrow as compared to the hysteresis loop of core 31. The cores are selected so that a higher magnetization current level is required to saturate core 31 than that required to saturate core 24. The dots throughout the figures indicate winding directions on the cores.

The purpose of the reactance device 30 is to bypass the curernt in winding 26, especially when saturable reactor 22 is driven with large negative control signals, in order to prevent firing of the solid stage thyratron device 11 prior to saturation of core 24. This enables the saturable reactor to gate the solid state thyratron device at any desired firing angle in the forward conduction half cycle of the solid state thyratron device 11 and in turn control load power.

In the operation of the circuit of FIG. 1, assume a half cycle of the A.C. source 18 which is a forward conduction cycle for solid state thyratron device 11; this is also the forward direction for rectifier means 28. Solid state thyratron device 11 is in its non-energized or non-conducting state and presents a high impedance to flow, however the magnetic control circuit arm through load winding 26 provides a parallel current path. Before core 24 saturates, practically full line voltage appears across load winding 26 and, excepting magnetization current, there is no current in the magnetic control circuit arm or the load 20. The time at which core 24 saturates during the cycle is determined by the net control ampere turns input to the saturable reactor 22. Prior to saturation of core 24 reactance device 30 prevents delivery of magnetization current to gate 16 of solid state thyratron device 11. After saturation a gating signal is delivered through transformer 30 to solid state thyratron device 30, firing the device, and providing a low impedance current path shunting the magnetic control circuit arm. Full load voltage (with the exception of a small voltage drop across solid state thyratron device 11, approximately 1 volt) is delivered to the load.

Considering the operation of transformer 30: prior to saturation of core 24, transformer 30 isolates the gating terminal 16. Transformer core 31 has a broad hysteresis loop and a relatively high magnetization current level. Inherently, transformer 30 will not transform until the current level in the circuit arm including rectifier 28, load winding 26 and primary winding 32 reaches the magnetization current level of the transfromer 30. Below this current level, current bypasses gating terminal 16 and is delivered to load 20. This current is insignificant as far as the load is concerned but not so as far as firing signals for solid state thyratron devices are concerned. The gating current of these devices may be as low as 25 milliamperes. If load winding 26 is connected directly to gating terminal 16, when high negative signals aiming to turn off the amplifier are introduced to the control windings 25, the current in winding 26 fires the solid state thyratron device 11. This increase in current when high negative control signals exist is well known in the magnetic amplifier art.

Figure 2:
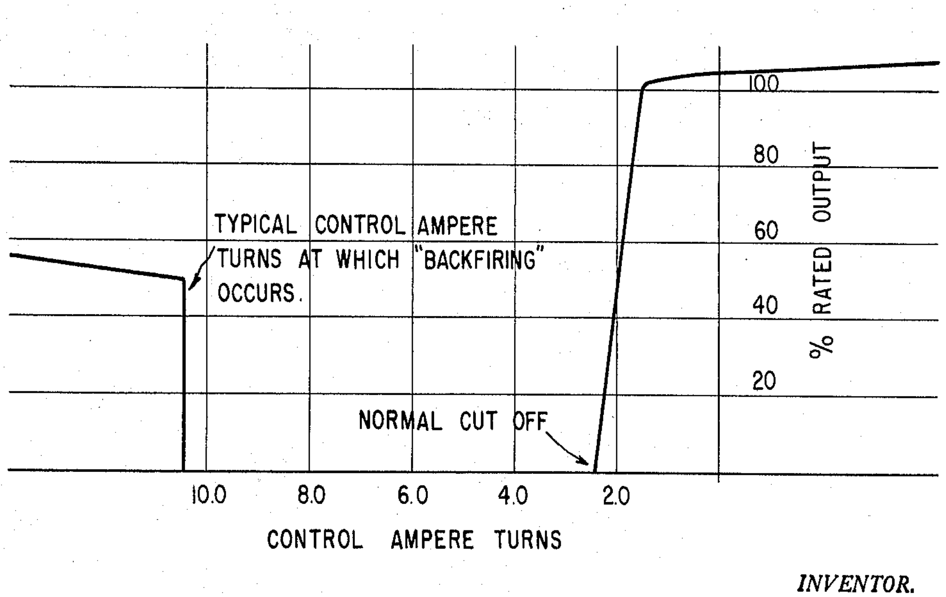
FIGURE 2 is a magnetic amplifier transfer curve.

The transfer curve for a typical magnetic amplifier in which the load winding is connected directly to the control terminal is shown in FIG. 2. The rated output for the magnetic amplifier is shown along the ordinate and the control ampere turns as shown along the abscissa. The normal cut off point on the transfer curve occurs at about 2.0 ampere turns. However if increasing negative signals are introduced, at approximately three to five times the normal cut off current, the amplifier is turned on; the turn-on point is a function of the gate requirements of the solid state thyratron device. As a result, a control signal designed to turn off the device, in which control current of three to five times the normal cut off current is generated, turns on the device; this may be referred to as "backfiring."

The magnetization current level of transformer 30 is in excess of the magnetization current level of the saturable reactor 22 so transformer 30 cannot change flux prior to saturation of core 24. Once saturable reactor 22 fires current increases rapidly. When this increased current equals the magnetization current of transformer 30, the transformer changes flux, saturation to opposite polarity saturation. Voltage is induced in secondary winding 33 during this flux change and the resulting current pulse gates the solid state thyratron device 11. During the non-conducting half cycle of rectifier 28 and solid state thyratron device 11 the flux level in transformer core 31 is reset to the original polarity saturation level through reset winding 34. On the next conducting half cycle the transformer must therefore again change flux (saturation to saturation), in order to pass a gating pulse and the cycle is repeated.

Transformer 30 will only transform during the flux change so that a pulse is generated which is ideal for firing solid state thyratron devices. The relative location of the pulse in the firing half cycle of the pulse is determined by the sum of the ampere turns control on the reactor 22. The height of the pulse varies with the gate requirements of the solid state thyratron device and these may change with operational temperature and load requirements without effecting the operation of the circuit. The solid state thyratron device itself clips the pulse once firing of the device has occurred.

Figure 3:
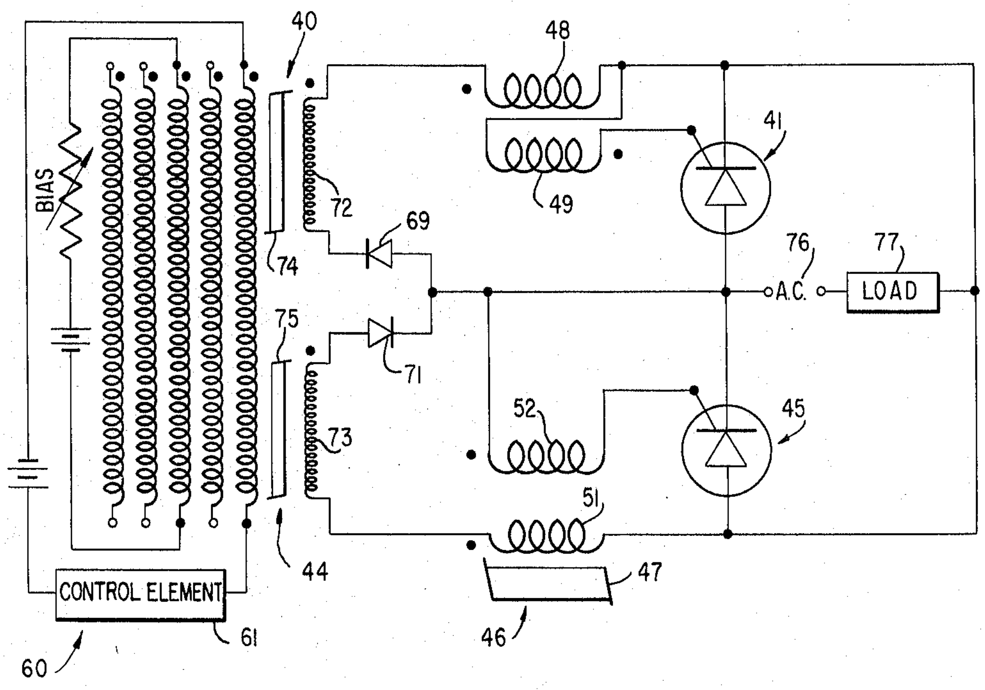
FIGURE 3 is an electrical schematic diagram of apparatus embodying the invention.

FIG. 3 shows the circuit diagram for full-wave operation. This control amplifier provides symmetrical excitation, with one-half firing a first solid state thyratron device during one half cycle and the other half firing a second solid state thyratron device during the other half cycle; saturable reactor 40 controls solid state thyratron device 41 and saturable reactor 44 controls solid state thyratron device 45. Transformer 45 has a rectangular hysteresis loop core 47 and includes primary winding 48 and secondary winding 49 connected in the output circuit of saturable reactor 40; and further includes primary winding 51 and secondary winding 52 connected in the output circuit of saturable reactor 44. The magnetizing current for transformer 46 is in excess of the magnetizing current requirement for saturable reactor 41 or 44.

Saturable reactors 40 and 44 include control windings 60; control element 61 may be manually controlled or automatically controlled responsive to a condition. During the forward half cycle of solid state thyratron device 41 when saturable reactor 40 fires current increases rapidly and when it equals the magnetizing current of transformer 46 the transformer changes flux from one saturation level to the opposite polarity saturation level. Voltage is induced in the secondary winding 49 when this flux change occurs, and the resulting current pulses gates solid state thyratron device 41.

On the next half cycle, the symmetrical circuit of saturable reactor 44 and solid state thyratron device 45 goes through a similar cycle. Due to the polarization of the transformer when reactor 40 saturated, transformer 46 must again change flux (saturation to saturation). Transformer 46 is always at the proper saturation level at the beginning of a cycle and goes through a complete flux change when the control input ampere turns are sufficient to "turn on" the magnetic amplifier.

Figure 4:
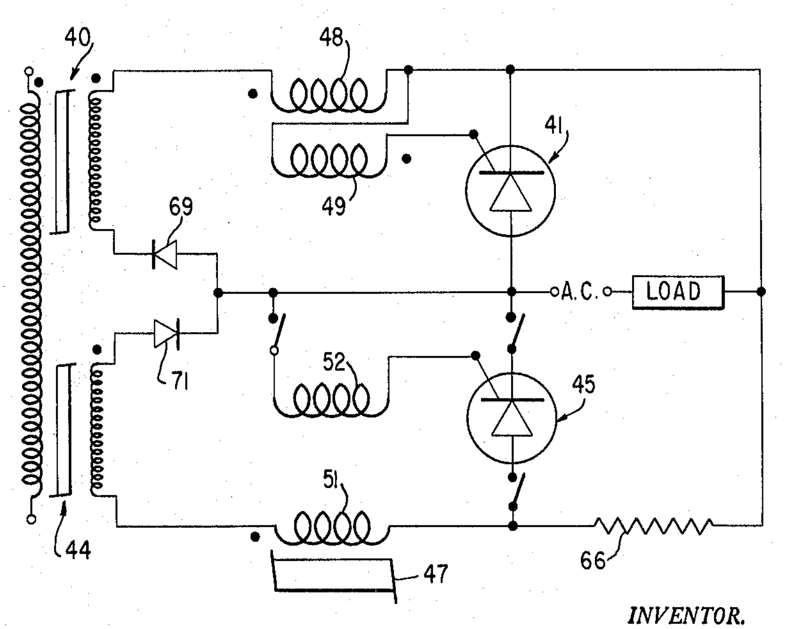
FIGURE 4 is an electrical schematic diagram of apparatus embodying the invention.

It will be noted that the push-pull nature of operation of the circuit of FIG. 3 always leaves core 47 at the correct saturation level. For half wave operation proper reset of the transformer core may be obtained by disconnecting the secondary winding 52 and solid state thyratron device 45 from the circuit and adding resistor 66 as shown in FIG. 4. During the forward half cycle of the source 68 as determined by the rectifier 69 and solid state thyratron device 41 the operation of the saturable reactor 40 and primary winding 48 and secondary winding 49 is as previously described in relation to FIG. 1. During the non-conducting half cycle of rectifier 69 and solid state thyratron device 41, rectifier 71 is conducting and after saturable reactor 44 fires current in primary winding 51 reaches a level permitting flux in core 47 to change from saturation to opposite polarity saturation. Core 47 is then saturated at the proper polarity for the next half cycle.

The invention may be employed where variable voltage, A.C. or D.C. is required and can be applied to multiphase operations by, for example, the use of a magnetically controlled solid state thyratron device per phase. Typical applications include D.C. motor speed control, heat control in industrial furnaces, lighting control for auditoriums, etc. Since the magnetic control circuit is not required to handle load power it can be designed for maximum speed of response, and the power frequency range can be extended. Also, the size and weight requirements of saturable reactors in high power applications are considerably reduced; for example a one kva. unit embodying the invention would have a total weight of about 5 lbs., whereas a one kva. unit in which the saturable reactor load windings are required to handle load power would have a weight of about 65 lbs. Further, since the saturable reactor output windings are not in series with the load, power losses are reduced and the entire input power is delivered to the load. Other advantages will be obvious to those skilled in the art from the disclosure included herein.

In a specific embodiment of the invention, typical circuit values for FIGURE 3 are:

| | |
|---|---|
| Saturable reactor load windings **72** and **73** | 4700 turns each, #35 wire. |
| Saturable reactor control windings | 160 turns each, #31 wire. |
| Saturable reactor cores **74** and **75** | Orthonol cores, #50035–2A, Magnetics, Inc. |
| Transformer windings **48**, **49**, **51** and **52** | 30 turns each, #35 wire. |
| Transformer core **47** | Orthonol core, #5003–2A, Magnetics, Inc. |
| Rectifiers **69** and **71** | 1 N1696. |
| Solid state thyratron devices **41** and **45** | SCR 2 N685. |
| A.C. source **76** | 120 v., 60 cycle. |
| Output | 3.85 kva. |
| Sensitivity | 6 ma. or 1 ampere turn controls load voltage over the range of 5% to 95% of full output. |

In disclosing the invention specific circuits have been described; modifications and variations of these circuits are made possible by the teachings included herein; therefore it is to be understood that, within the scope of the appended claims, the invention, may be practiced otherwise than as specifically described.

What is claimed is:

1. Electrical apparatus for providing magnetic control of a solid state thyratron device comprising
a saturable reactor means having a core of rectangular hysteresis loop material and including an output winding;
rectifier means;
transformer means having a core of rectangular hysteresis loop material with a magnetization current level substantially greater than that of the saturable reactor, the transformer means including a primary and secondary winding;
anode, cathode, and gating terminals for a solid state thyratron device;
means for connecting an A.C. power source across the anode and cathode terminals for the solid state thyratron device; and
circuit means connecting the output winding of the saturable reactor, the rectifier means, and the primary winding of the transformer means in series to the anode and cathode terminals and connecting the secondary winding of the transformer means to the gating terminal.

2. Electrical apparatus for providing magnetic control of a solid state thyratron device comprising
means for connecting a solid state thyratron device to an A.C. voltage source,
terminal means for the solid state thyratron device including an anode, cathode, and gating terminal,
saturable reactor means including a saturable core and an output winding, the saturable core having a rectangular hysteresis loop with preselected low magnetization current level;
rectifier means;
transformer means including primary and secondary windings coupled to a transformer saturable core having a rectangular hysteresis loop with magnetization current level substantially greater than the magnetization current level of the saturable reactor core; and
circuit means for connecting the output winding of the saturable reactor means, the rectifier means, and the primary winding of the transformer means in series with the anode and cathode terminals of the solid state thyratron device to provide a current path through the primary winding prior to firing of the saturable reactor means, the circuit means further including means for connecting the secondary winding of the transformer means to the gating terminal of the solid state thyratron device to render the solid state thyratron device conductive after firing of the saturable reactor means.

3. Electrical apparatus for providing magnetic control of a solid state thyratron device comprising
saturable reactor means having an output winding coupled to rectangular hysteresis loop saturable core material of preselected low magnetization current level;
rectifier means;
transformer means having a primary and a secondary winding coupled to rectangular hysteresis loop saturable core material, the transformer core material having a magnetization current level substantially greater than the magnetization current level of the saturable reactor means;
terminal means for a solid state thyratron device including anode, cathode, and gating terminals;
circuit means for connecting the output winding of the saturable reactor means and the rectifier means in series with the primary winding of the transformer means so as to induce a voltage in the secondary winding of the transformer means only after saturation of the core material of the saturable reactor means; and
means for connecting the secondary winding of the transformer means to the gating terminal of the solid state thyratron device to control firing of the solid state thyratron device.

4. The electrical apparatus of claim 3 further including means for resetting flux level in the rectangular hysteresis loop core material of the transformer means after firing of the saturable reactor means.

5. In combination
an A.C. source;
a load means;
a solid state thyratron device including anode, cathode, and gating elements;
a saturable reactor means including output winding means coupled to a saturable core having rectangular hysteresis loop core material of preselected low magnetization current level;
rectifier means;
transformer means including primary and secondary windings coupled to a transformer saturable core having rectangular hysteresis loop core material of magnetization current level substantially greater than that of the saturable core of the saturable reactor means; and
circuit means for connecting the output winding of the saturable reactor means and the primary winding of the transformer means in series across the anode and cathode elements of the solid state thyratron device, for connecting the anode and cathode elements across the A.C. source, and for connecting the secondary winding of the transformer means to the gating element of the solid state thyratron device to gate the solid state thyratron device after firing of the saturable reactor means.

References Cited by the Examiner

UNITED STATES PATENTS

| | | | |
|---|---|---|---|
| 2,925,546 | 2/1960 | Berman | 323—22 |
| 2,998,547 | 8/1961 | Berman | 323—22 |
| 3,019,355 | 1/1962 | Morgan | 307—88.5 |
| 3,129,381 | 4/1964 | Manteuffel | 323—24 X |
| 3,181,071 | 4/1965 | Smith et al. | 328—65 |

OTHER REFERENCES

Controlled Rectifier Manual, by H. R. Lowry et al., copyright 1960, by General Electric Company, page 47.

LLOYD McCOLLUM, *Primary Examiner*

MILTON O. HIRSHFIELD, *Examiner*.